(12) United States Patent
Komori

(10) Patent No.: US 11,092,578 B2
(45) Date of Patent: Aug. 17, 2021

(54) OPENING SEALING STRUCTURE, SAMPLE VAPORIZATION UNIT, AND GAS CHROMATOGRAPH

(71) Applicant: Shimadzu Corporation, Kyoto (JP)

(72) Inventor: Yuki Komori, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 310 days.

(21) Appl. No.: 16/060,205

(22) PCT Filed: Dec. 7, 2015

(86) PCT No.: PCT/JP2015/084307
§ 371 (c)(1),
(2) Date: Oct. 3, 2018

(87) PCT Pub. No.: WO2017/098565
PCT Pub. Date: Jun. 15, 2017

(65) Prior Publication Data
US 2019/0017975 A1    Jan. 17, 2019

(51) Int. Cl.
*G01N 30/60*    (2006.01)
*G01N 30/12*    (2006.01)
(Continued)

(52) U.S. Cl.
CPC ......... *G01N 30/6026* (2013.01); *G01N 30/12* (2013.01); *G01N 30/18* (2013.01);
(Continued)

(58) Field of Classification Search
CPC ......... G01N 2030/185; G01N 30/6026; G01N 30/12; G01N 30/18; G01N 2030/025; G01N 2030/126
See application file for complete search history.

(56) References Cited

U.S. PATENT DOCUMENTS 1,863,796  A    6/1932  Jackson et al.
3,463,012  A  *  8/1969  McKinney ............. G01N 30/12
                                                         73/863.11
(Continued)

FOREIGN PATENT DOCUMENTS

CN    1755358  A    4/2006
CN   102869403 A    1/2013
(Continued)

OTHER PUBLICATIONS

Notice of Reasons for Refusal for corresponding Japanese Patent Application No. 2017-554684, dated Jun. 24, 2019.
(Continued)

*Primary Examiner* — Lisa M Caputo
*Assistant Examiner* — Alex T Devito
(74) *Attorney, Agent, or Firm* — Muir Patent Law, PLLC

(57) ABSTRACT

An opening sealing structure is provided with a housing, a step portion, a seal cap, an elastic sealing member, and a cap fixture. The housing has a cap mounting portion having a a cylindrical shape. The step portion is provided on the outer peripheral surface of the cap mounting portion and has a side surface facing the base end side of the cap mounting portion. The side surface of the step portion is inclined along the circumferential direction of the cap mounting portion from the tip end side of the cap mounting portion to the base end side and its inclination angle is smaller on the base end side of the cap mounting portion than on the tip end side. The cap fixture has a cap holding portion movably engaged with the seal cap in a circumferential direction of its outer peripheral surface and an elastic portion connected to the cap holding portion. The elastic portion is provided with a protrusion which engages the side surface of the step portion.

6 Claims, 10 Drawing Sheets

(51) Int. Cl.
*G01N 30/18* (2006.01)
*G01N 30/02* (2006.01)

(52) U.S. Cl.
CPC . *G01N 2030/025* (2013.01); *G01N 2030/126* (2013.01); *G01N 2030/185* (2013.01)

(56) References Cited

U.S. PATENT DOCUMENTS

| | | | | |
|---|---|---|---|---|
| 5,624,645 | A * | 4/1997 | Malley | B01J 7/02 422/266 |
| 6,095,572 | A * | 8/2000 | Ford | G01N 30/6039 285/361 |
| 6,626,699 | B1 * | 9/2003 | Epe | H01R 13/625 439/311 |
| 2002/0017524 | A1 | 2/2002 | Hagano et al. | |
| 2006/0065122 | A1 * | 3/2006 | Song | G01N 30/12 96/105 |
| 2009/0200217 | A1 * | 8/2009 | Kim | C02F 1/003 210/136 |
| 2011/0084549 | A1 * | 4/2011 | Scheele | H05K 7/026 307/9.1 |

FOREIGN PATENT DOCUMENTS

| | | |
|---|---|---|
| JP | 1980-084242 | 1/1982 |
| JP | 2001-247141 A | 9/2001 |
| JP | 2001-348050 A | 12/2001 |
| JP | 0003129007 U | 2/2007 |
| WO | 2015004757 A1 | 1/2015 |

OTHER PUBLICATIONS

First Office Action dated May 20, 2020 from the Chinese Patent Office for corresponding Chinese Patent Application No. 201580085171.1.
CNOA—Office Action of Chinese Patent Application No. 201580085171.1 dated Dec. 16, 2020, with Machine English Translation.
CNOA—Office Action of Chinese Patent Application No. 201580085171.1 dated Jun. 1, 2021, with Machine English Translation.

* cited by examiner

OPENING SEALING STRUCTURE, SAMPLE VAPORIZATION UNIT, AND GAS CHROMATOGRAPH

TECHNICAL FIELD

The present invention relates to an opening sealing structure having a structure for detachably attaching a cap to a portion having an opening, such as a sample vaporization unit or a gas chromatograph, a sample vaporization unit having such a structure, and a gas chromatograph equipped with the sample vaporization unit.

BACKGROUND ART

In general, a gas chromatograph is provided with a sample vaporization unit for vaporizing a sample and feeding it to an analytical column. An example of a sample vaporization unit is described. The sample vaporization unit has a housing. The inside of the housing, there is a space to become a sample vaporizing chamber. On the top of the housing, a sample injection port for injecting a sample into the sample vaporization unit is provided. The lower portion of the sample vaporization chamber is connected to the analytical column, and a carrier gas is introduced from the upper portion of the sample vaporization chamber. The sample vaporization chamber is heated to a high temperature and a liquid sample injected into the sample vaporization chamber is vaporized by heat and sent to the analytical column by the carrier gas.

In the sample vaporization chamber inside the housing, a cylindrical insert made of silica glass or the like is accommodated, and the sample injected from the sample inlet port is vaporized inside the insert. Since the sample is designed to be vaporized inside the insert, the sample gas can be introduced into the analytical column without contacting the metal inner wall of the sample vaporization chamber.

Since the insert comes into direct contact with a sample, it is a part which easily gets dirty due to attachment of residues, etc., after the sample vaporization. For this reason, inserts are accommodated in a sample vaporization chamber in a detachable manner so that periodic replacement and cleaning of the insert can be performed (see Patent Document 1).

Generally, an opening communicated with the sample vaporization chamber is provided on the upper surface of the housing, and the opening is configured to be sealed by attaching a seal cap with an O-ring interposed therebetween. A sample inlet port for injecting a sample by piercing a needle for injecting a sample is provided in the seal cap. In the seal cap, a septum for closing the sample inlet port after the needle for injecting a sample is pulled out is provided.

As a structure for attaching a seal cap to a housing, a structure is generally adopted in which a screw provided on the housing side is threadedly engaged with a screw provided on the side of the seal cap by rotating and tightening the seal cap. However, in such a structure, when replacing the insert, it is necessary to turn the seal cap by using a tool such as a spanner, but there are a pipe, etc., for introducing the carrier gas around the sample inlet port, so it is difficult to manipulate the tool and it is not an easy task. Therefore, a mechanism capable of facilitating attachment and detachment of a seal cap without using a tool has been desired.

As a mechanism for solving the aforementioned problem, a mechanism has been proposed in which a protrusion is provided on a housing (lower assembly) side, an inclined surface for hooking the protrusion on the housing side is provided on the seal cap (upper assembly) side, and the seal cap is rotated with the protrusion on the housing side engaged with the inclined surface on the seal cap to raise the protrusion along the inclined surface to thereby attach the seal cap to the housing (see Patent Document 2).

PRIOR ART

Patent Document

Patent Document 1: Japanese Patent Application Publication No. 2009-92672
Patent Document 2: U.S. Pat. No. 7,273,518 B2

SUMMARY OF THE INVENTION

Problems to be Solved by the Invention

In the sample vaporization unit, in addition to facilitate the task of securing the seal cap to the housing, it is also important to assuredly secure the airtightness of the sample vaporization chamber when the seal cap is fixed to the housing. In a conventional sample vaporization unit, when fixing the seal cap to the housing, it sometime happens that the sealing cap was tightened weakly to cause insufficient airtightness of the sample vaporization chamber. To the contrary, there also was a problem that the seal cap was tightened too strongly, causing excessive deformation of an O-ring provided to for the purpose of maintaining the airtightness of the sample vaporization chamber, which damages the O-ring.

Under the circumstances, an object of the present invention is to make it possible to easily and properly perform a work of attaching and detaching a seal cap to a member having an opening such as a sample vaporization unit.

Means for Solving the Problems

An opening sealing structure according to the present invention is provided with a housing, a step portion, a seal cap, an elastic sealing member, and a cap fixture. The housing has an internal space and a cylindrical cap mounting portion provided with an opening communicated with the internal space at a tip end side. The step portion is provided on the outer peripheral surface or the inner peripheral surface of the cap mounting portion and has a side surface facing the base end side of the cap mounting portion. The side surface of the step portion is inclined along the circumferential direction of the cap mounting portion from the tip end side of the cap mounting portion to the base end side and its inclination angle is smaller on the base end side of the cap mounting portion than on the tip end side. The seal cap is detachably attached to the cap mounting portion of the housing to seal the opening. The elastic sealing member is a ring-shaped elastic member to be sandwiched between the seal cap and the housing. The cap fixture has a cap holding portion movably engaged with the seal cap in a circumferential direction of its outer peripheral surface and an elastic portion connected to the cap holding portion. The elastic portion is provided with a protrusion which engages the side surface of the step portion. The cap fixture is rotatably mounted on the cap mounting portion so that the protrusion slides along the side surface of the step portion and has a spring property that generates an elastic force for pressing the cap holding portion toward the opening side so as to seal the opening by deforming the sealing member when the protrusion approaches the position closest to the base end portion of the cap holding portion on the side surface of the step portion.

Here, the "inclination angle" of the step portion formed on the outer peripheral surface or the inner peripheral surface of the cap mounting portion is an inclination angle with respect to a plane perpendicular to the axial direction of the cap mounting portion. When attaching the seal cap to the cap mounting portion, the cap fixture is rotated in a plane perpendicular to the axial direction of the cap mounting portion. Hereinafter, the plane perpendicular to the axial direction of the cap mounting portion is defined as the "rotation plane" of the cap fixture.

When the cap fixture is rotated in the rotation plane, the protrusion moves in the circumferential direction along the outer peripheral surface of the cap mounting portion and slides on the side surface of the step portion. Since the side surface of the step portion with which the protrusion is engaged is inclined with respect to the rotation plane, the protrusion is displaced in the axial direction of the cap fixture along the step portion as the cap fixture rotates, whereby an elastic force in the axial direction of the cap mounting portion is generated in the elastic portion of the cap mounting portion. When the elastic force in the axial direction of the cap mounting portion occurs in the elastic portion, the seal cap held by the cap fixture is pushed toward the base end portion side of the cap mounting portion, pressing the elastic sealing member sandwiched between the seal cap and the housing to cause deformation of the elastic sealing member. Thus, the opening of the housing is sealed with the seal cap.

A sample vaporization unit according to the present invention is an embodiment of the opening sealing structure. That is, the sample vaporization unit according to the present invention is equipped with a cylindrical insert, a housing, a step portion, a seal cap, an elastic sealing member, and a cap fixture. The housing has an internal space for accommodating the insert. The housing is provided with a cap mounting portion for mounting the seal cap, and the opening of the cap mounting portion is sealed with the same structure as the opening sealing structure.

An embodiment of the gas chromatograph according to the present invention is provided with the sample vaporization unit, an analytical column connected to the outlet portion of the sample vaporization unit to separate a sample that has passed through the sample vaporization unit, and a detector for detecting the sample separated by the analytical column.

Effects of the Invention

In the opening sealing structure according to the present invention, a step portion is provided on the outer peripheral surface or the inner peripheral surface of the cap mounting portion provided on the housing. When the cap fixture is rotated with the protrusion of the cap fixture holding the seal cap engaged with the step portion and the protrusion is slid along the side surface of the step portion to the most base end portion side of the cap mounting portion of the step portion, an elastic force for pressing the cap holding portion toward the opening side is generated in the elastic portion of the cap fixture so that the seal cap deforms the elastic sealing member to seal the opening. Therefore, only by simply rotating the cap fixture, the seal cap can be easily attached to the cap mounting portion of the housing.

In addition, since the cap fixture is provided with the elastic portion that elastically deforms, it is possible to prevent the elastic sealing member from being excessively deformed due to excessive tightening of the seal cap when the cap fixture is rotated. An elastic sealing member, such as an O-ring, has an appropriate deformation amount capable of repeatedly performing elastic deformation, and when the deformation exceeding the appropriate deformation amount is made, the material deteriorates, which prevents the material from returning to its original shape. In the present invention, the shape and the material of the elastic portion and the shape of the step portion of the cap mounting portion are determined so that an elastic force to deform the elastic sealing member by an appropriate amount occurs in the elastic portion of the cap fixture when the cap fixture is fully turned by a predetermined amount.

In attaching the seal cap to the cap mounting portion, when the amount of displacement of the protrusion in the axial direction of the cap mounting portion increases as the cap fixture rotates, the elastic force of the elastic sealing member of the cap fixture and the repulsive force of the elastic sealing member becomes stronger. For this reason, if the step portion of the cap mounting portion is linearly inclined along the circumferential direction of the cap mounting portion, the force necessary to rotate the cap fixture (hereinafter referred to as the "operation force") increases in accordance with the rotation angle of the cap fixture. Therefore, a large operating force is required immediately before fully rotating the cap fixture.

Therefore, in the opening sealing structure according to the present invention, the inclination angle of the side surface of the step portion is smaller on the base end side of the cap mounting portion than that on the tip end side thereof. Since the elastic force of the elastic portion of the cap fixture acting on the protrusion and the repulsive force of the elastic sealing member act in the axial direction of the cap mounting portion, the smaller the inclination angle of the side surface of the step portion is, the force in a direction along the side surface of the step portion acting on the protrusion becomes smaller. The detailed description of such a matter will be described later with reference to FIG. 8.

Therefore, when the protrusion is positioned on the tip end side of the cap mounting portion, the elastic force of the elastic portion of the cap fixture and the repulsive force of the elastic sealing member are relatively small, so the inclination angle of the side surface of the step portion positioned at the tip end side of the cap mounting portion is set to be relatively large. Conversely, when the protrusion approaches the base end side of the cap mounting portion, the elastic force of the elastic portion and the repulsive force of the elastic sealing member become larger, so the inclination angle of the side surface of the step portion positioned on the base end side of the cap mounting portion is set to be relatively small. With this, it is possible to equalize the operating force when rotating the cap fixture. The maximum operating force when rotating the cap fixture decreases, so that the maximum value of the vertical drag between the side surface of the step portion and the protrusion also becomes small, which reduces the friction between the side surface of the step portion and the protrusion. With this, the abrasion amount of parts can be reduced.

In the sample vaporization unit according to the present invention, the opening of the housing is sealed by the same structure as the opening sealing structure. Therefore, the attachment and detachment of the seal cap is easy, and the operating force when rotating the cap fixture is equalized. Therefore, a good operation feeling can be obtained at the time of attaching/detaching the seal cap.

The gas chromatograph of the present invention is equipped with the sample vaporization unit of the present invention. Therefore, the attaching/detaching operation of the sample vaporization unit is facilitated, which improves the efficiency of the maintenance work.

EMBODIMENTS FOR CARRYING OUT THE INVENTION

In the opening sealing structure and the sample vaporization unit according to the present invention, it is preferable that a step portion have two or more sections different in the inclination angle on a side surface and the inclination angle of each section be an angle at which the maximum value of the force acting on the cap fixture in the rotation direction of the cap fixture becomes substantially equal in each section. This further equalizes the operating force when rotating the cap fixture, which enables for the user to obtain a better operation feeling at the time of attaching/detaching the seal cap.

A locking portion configured to be engaged with the protrusion to stop the protrusion at the position may be provided at a position closest to the base end portion on the side surface of the step portion. With this, in the state in which the seal cap is fixed, it is possible to suppress returning of the pin to thereby prevent natural loosening of the seal cap.

Figure 1:
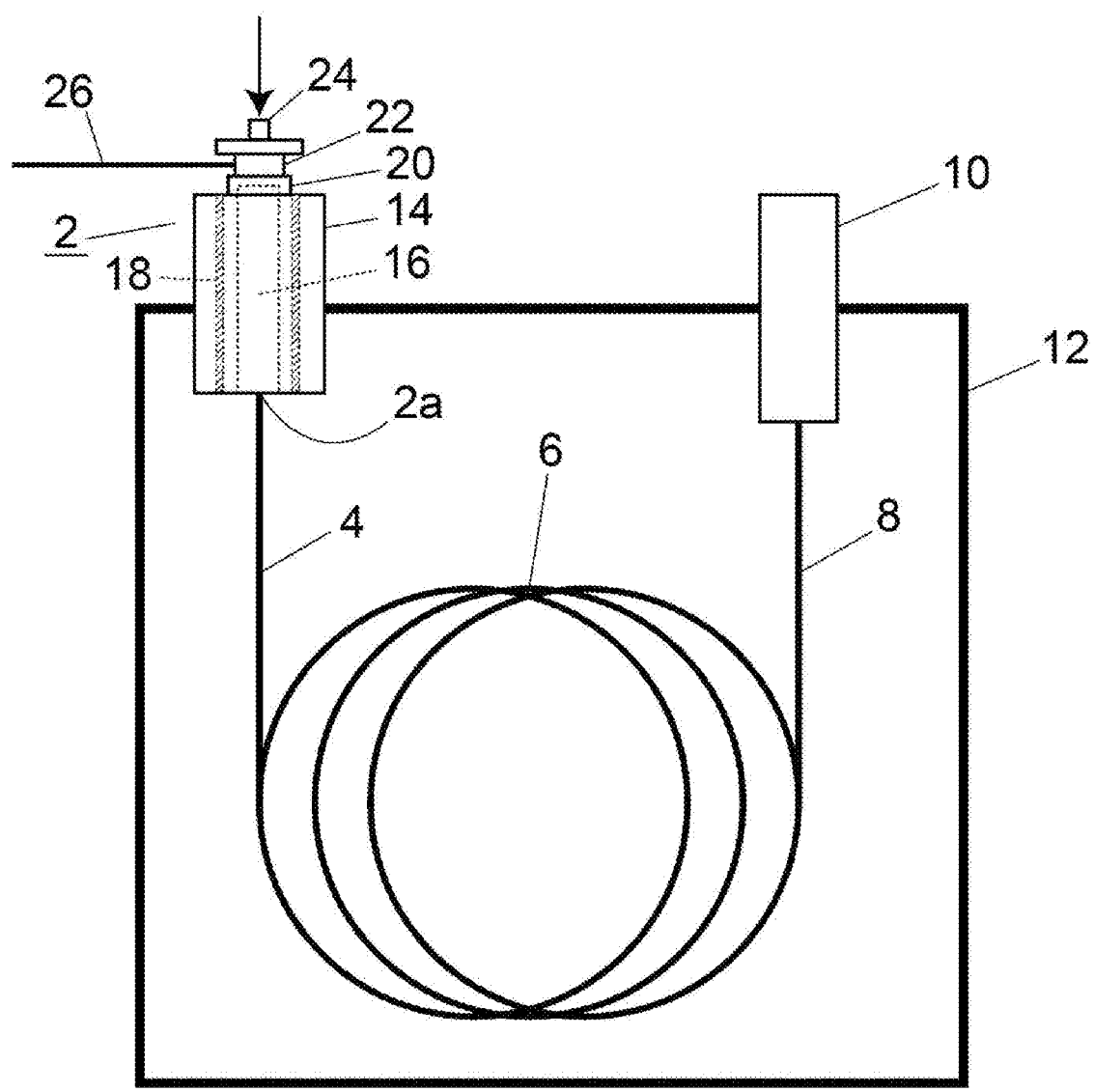
FIG. 1 is a block diagram schematically showing an example of a gas chromatograph.

An embodiment of a gas chromatograph will be described with reference to FIG. 1.

The gas chromatograph of this example has a sample vaporization unit 2 (opening sealing structure), an analytical column 6, a detector 10, and a column oven 12. The flow path 4 on one end side of the analytical column 6 is connected to an outlet portion 2a of the lower end of the sample vaporization unit 2, and the flow path 8 on the other end side is connected to a detector 10. The analytical column 6 is accommodated in the column oven 12, and the sample vaporization unit 2 and the detector 10 are fixed to the upper portion of the column oven 12.

In the sample vaporization unit 2, a columnar insert 16 forming a sample vaporization chamber is accommodated in the internal space of the housing 14, and the internal space accommodating the insert 16 is heated by a heater 18. An opening 28 (see FIG. 2) communicating with the internal space accommodating the insert 16 is provided on the upper surface of the housing 14, and the edge of the opening 28 projects annularly upward from the upper surface of the housing 14 to form a cap mounting portion 20. A seal cap 22 is attached to the cap mounting portion 20, and the opening 28 is sealed with the seal cap 22. The seal cap 22 is provided with a needle insertion portion 24 opening upward which guides a sample injection needle lowered from the upper side to the internal space of the housing 14.

A pipe 26 for supplying a carrier gas for feeding a sample gas vaporized in the sample vaporization chamber 16 to the analytical column 6 is connected to the seal cap 22. The carrier gas from the pipe 26 is introduced between the upper end of the insert 16 and the needle insertion portion 24.

A sample to be analyzed is injected into the housing 14 by a needle inserted into the housing 14 via the needle insertion portion 24 and vaporized in the insert 16 heated by the heater 18. The sample gas vaporized in the insert 16 is introduced into the analytical column 6 by the carrier gas from the pipe 26, separated for each component by the analytical column 6, and then detected for each component by the detector 10. Although not shown in this example, in some cases, a detector such as a mass spectrometer may be connected further downstream of the detector 10. The present invention is also applicable to such a gas chromatograph.

Next, the sample vaporization unit 2 will be described with reference to FIG. 2 to FIG. 7.

Figure 2:
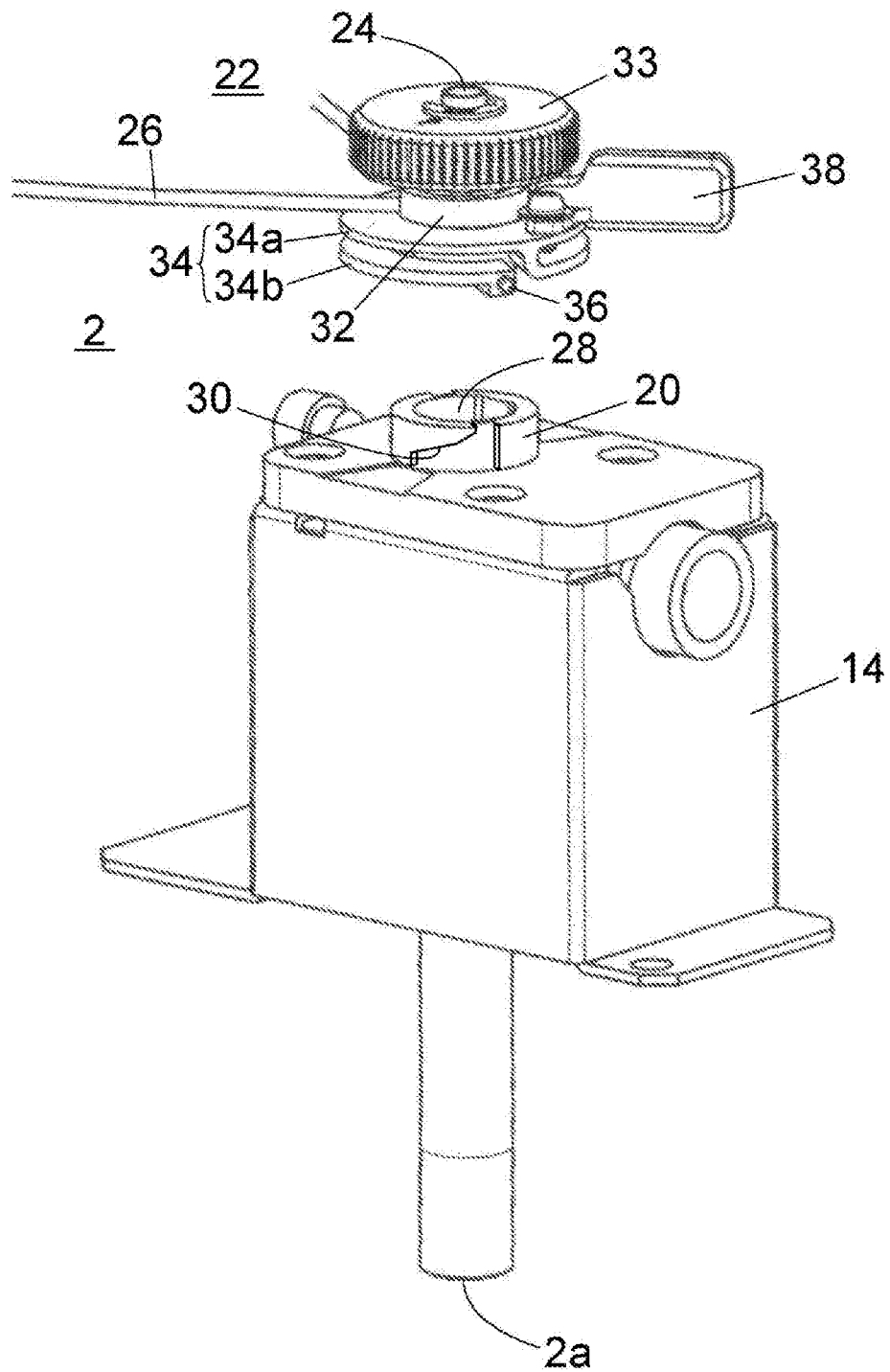
FIG. 2 is a perspective view of an example of a sample vaporization unit in a state before attaching a seal cap.
Figure 3:
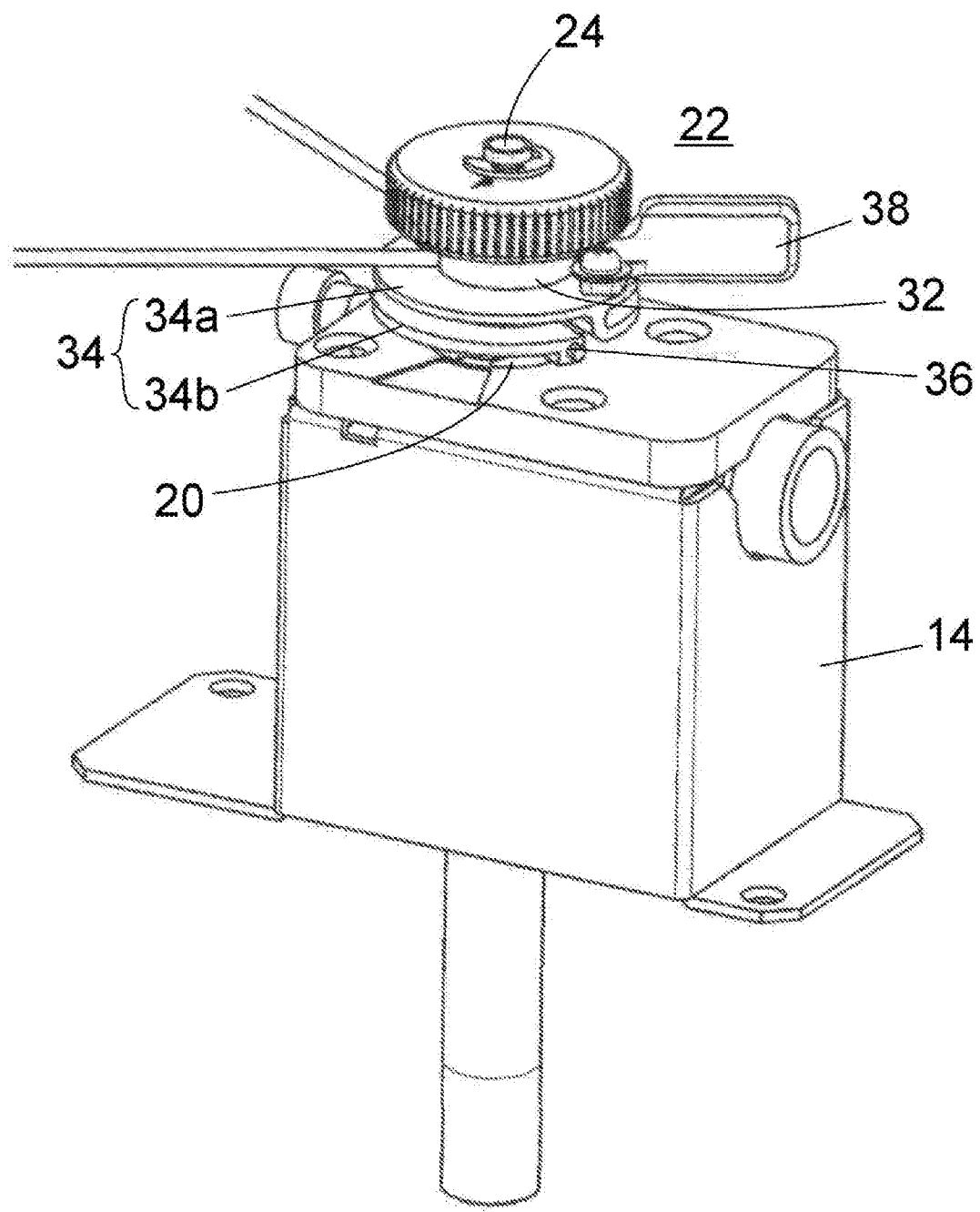
FIG. 3 is a perspective view of the example in a state after the attaching the seal cap.
Figure 4:
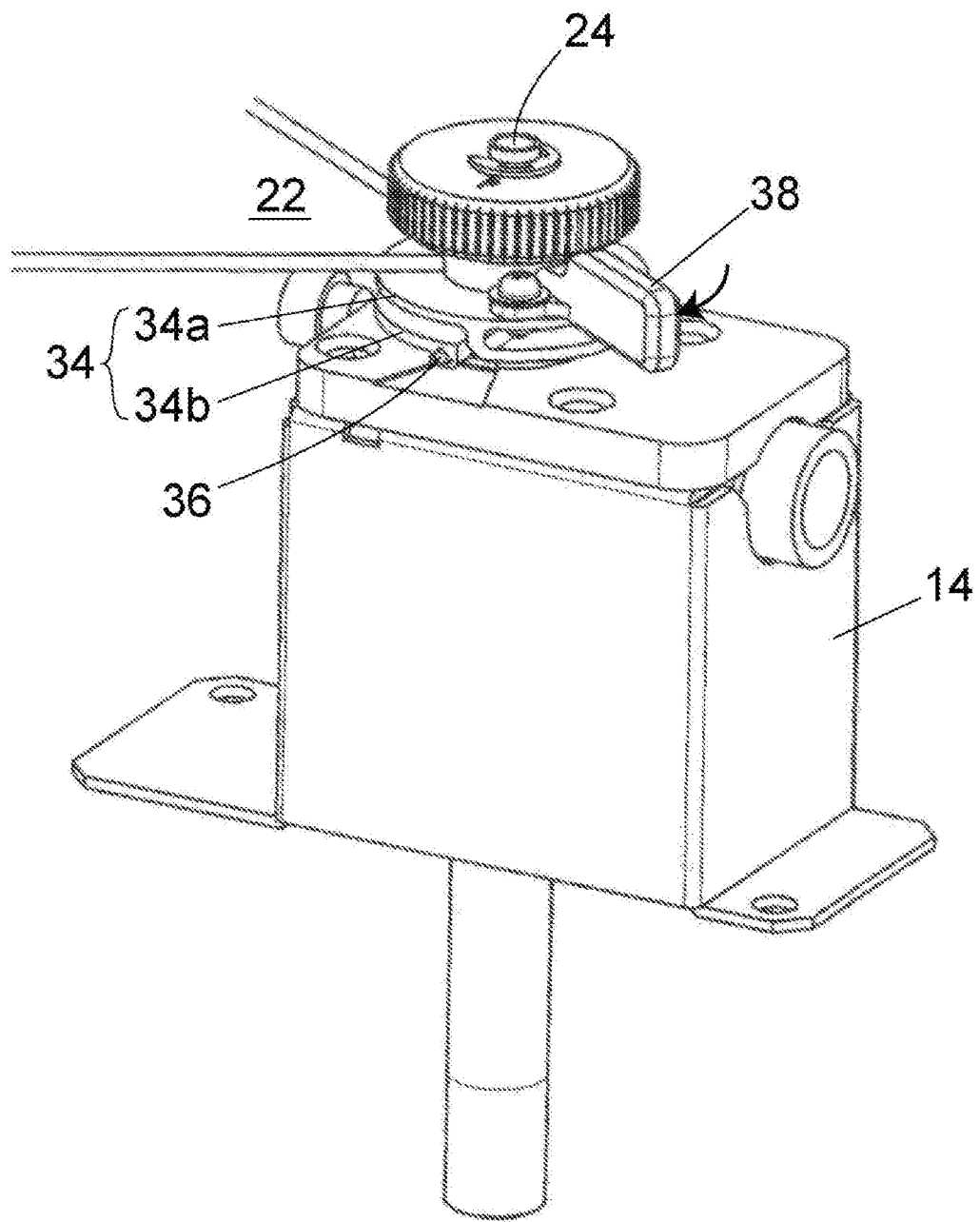
FIG. 4 is a perspective view of the example in a state after fixing the seal cap.

As shown in FIG. 2 to FIG. 4, the housing 14 of the sample vaporization unit 2 has a rectangular column shape in this example. The shape of the housing 14 is not limited to a rectangular column shape, but may be a cylindrical shape or another shape. The housing 14 is equipped with a space 14a (see FIG. 5, hereinafter referred to as an "internal space 14a") for accommodating the insert 16 therein. The internal space 14a is formed of a cylindrical hole that communicates from the upper surface of the housing 14 to the outlet portion 2a at the lower portion. The housing 14 is made of a metal material having good thermal conductivity. Although not shown in FIG. 2, the heater 18 (see FIG. 1) is embedded in the housing 14 so as to surround the internal space 14a, and the heater 18 heats the insert 16 accommodated in the internal space 14a. The insert 16 is a cylindrical member made of silica glass or the like.

The opening 28 of the housing 14 is sealed with a seal cap 22. The seal cap 22 is composed of a seal cap main body portion 32 of a cylindrical shape and a disk shaped septum cover 33 attached to the uppermost portion of the seal cap main body portion 32. The needle insertion portion 24 is provided in the septum cover 33.

Figure 5:
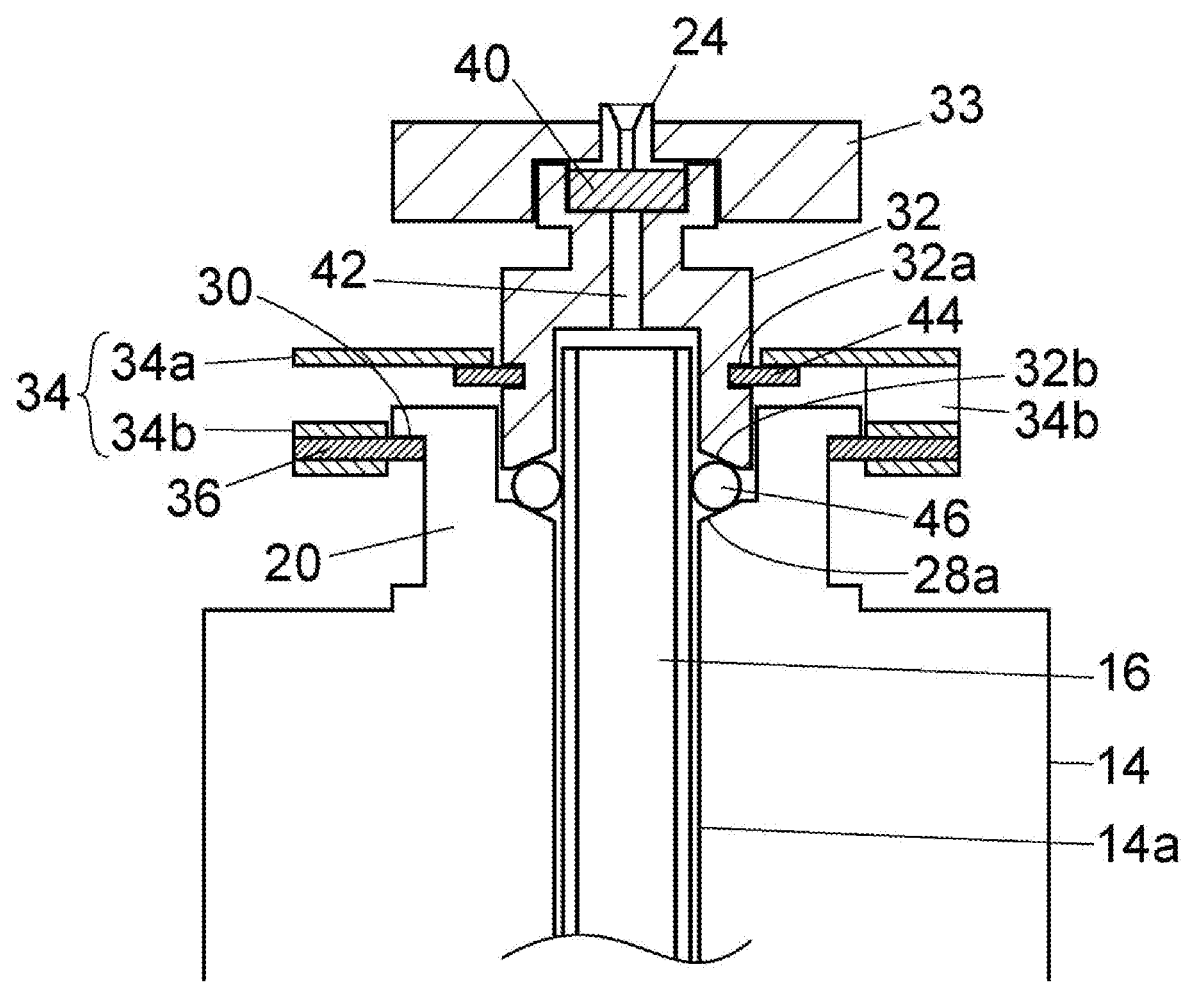
FIG. 5 is a cross-sectional view of the example.

As shown in FIG. 5, a septum 40 is arranged at the uppermost portion of the seal cap main body portion 32, and the septum cover 33 is attached to the uppermost portion of the seal cap main body portion 32 so that the needle insertion portion 24 is positioned above the septum 40. The septum 40 is capable of being penetrated by a sample injection needle inserted from the needle insertion portion 24 and closing the through-hole formed by the needle due to its elasticity after the needle is pulled out. The septum 40 is made of an elastic material, such as, e.g., natural rubber and silicone rubber. A sample is injected from the tip of the needle penetrating the septum 40 to the insert 16 side via the through-hole 42 at the center of the seal cap main body portion 32.

The edge of the opening 28 of the upper surface of the housing 14 protrudes upward in an annular shape to form a cap mounting portion 20. The seal cap 22 is fixed to the cap mounting portion 20 by the cap fixture 34. In this example, a step portion 30 is provided at two symmetrical positions of the outer peripheral surface of the cap mounting portion 20. Note that the step portion 30 may be provided at three or more positions. The step portion 30 is inclined along the circumferential direction of the cap mounting portion 20 from the tip end side of the cap mounting portion 20 to the base end side thereof. This step portion 30 has a side surface facing the base end side of the cap mounting portion 20. When attaching the seal cap 22 to the housing 14, the pin 36 (protrusion) of the cap fixture 34 provided on the seal cap 22 is engaged with the side surface of the step portion 30. When the cap fixture 34 is rotated in a plane (a rotation plane) perpendicular to the axial direction of the cap mounting portion 20, the pin 36 slides along the side surface of the step portion 30 and is displaced in the axial direction of the cap mounting portion 20.

Figure 6A:
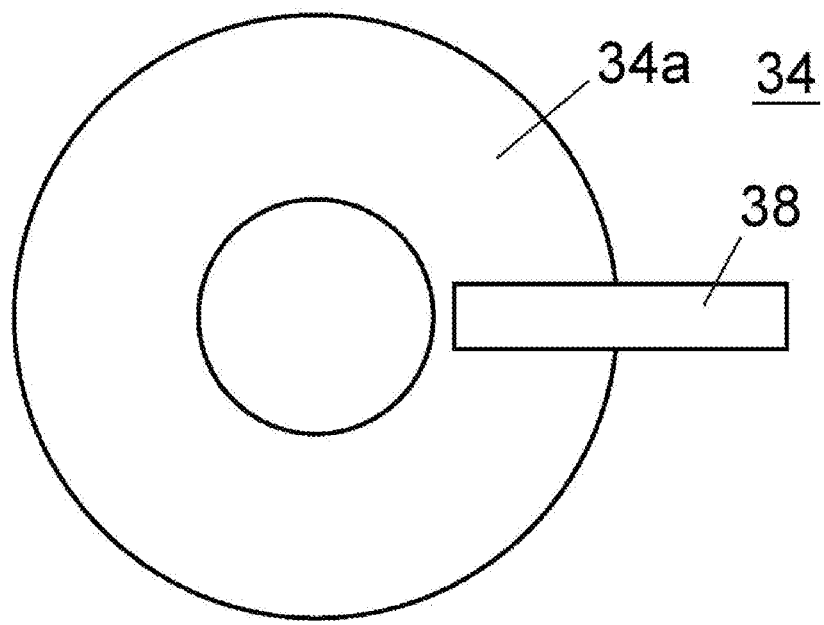
FIG. 6A is a plan view showing a cap fixture of the example.
Figure 6B:
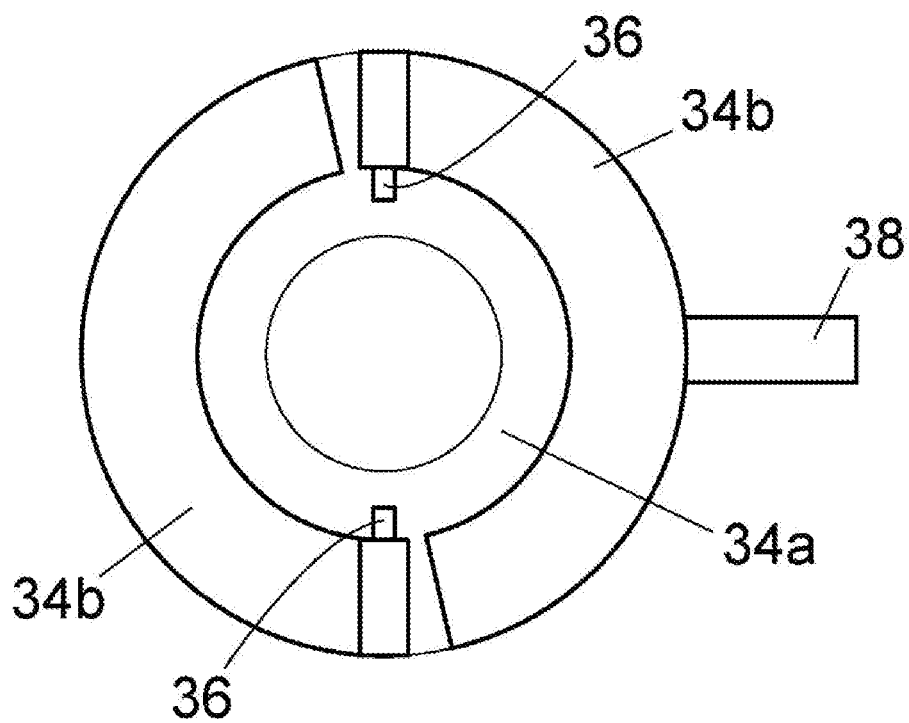
FIG. 6B is a bottom view showing the cap fixture of the example.
Figure 6C:
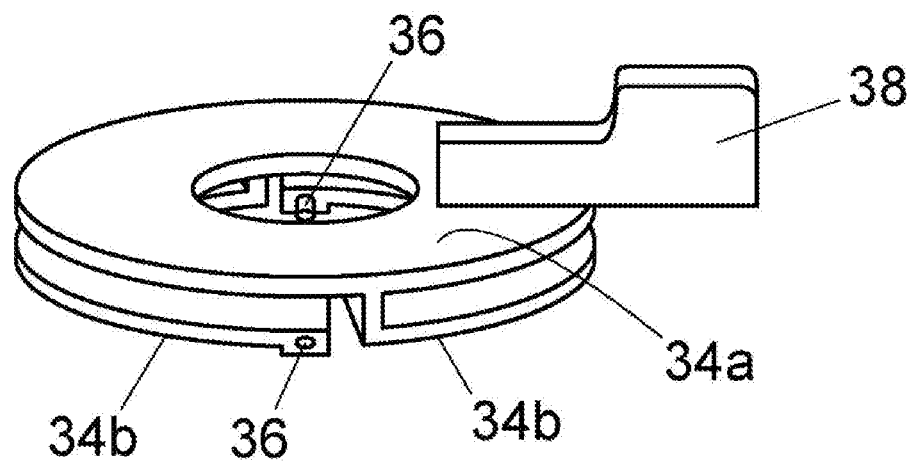
FIG. 6C is a perspective view showing the cap fixture of the example.

As shown in FIG. 6A to FIG. 6C, the cap fixture 34 is provided with a cap holding portion 34a in the shape of a disk with a hole in the center and two elastic portions 34b integrated with the cap holding portion 34a on one side of the cap holding portion 34a. When a side which is not provided with the elastic portion 34b of the cap fixture 34 is referred to as a front side and a side which is provided with the elastic portion 34b is referred to as a back side, the cap fixture 34 is attached to the seal cap main body portion 32 so that the back side faces the housing 14 side.

The elastic portion 34b of the cap fixture 34 is provided at a certain distance from the cap holding portion 34a so as to draw an arc along the periphery of the cap holding portion 34a. The base end of the elastic portion 34b is integrated with the cap holding portion 34a, but the tip thereof is a free end. That is, the elastic portion 34b forms a cantilever spring. At the tip of the elastic portion 34b, a pin 36 protruding inward is provided. The two elastic portions 34b have the same shape, and the pin 36 at the tip of each elastic portion is arranged at positions opposed to each other. The cap holding portion 34a is provided with a lever 38 for holding and rotating the cap fixture 34.

In this example, the cap holding portion 34a and the elastic portion 34b of the cap fixture 34 are integrally formed by a production method such as scraping from a metal block or MIM (metal powder injection molding method). Note that the cap holding portion 34a and the elastic portion 34b may be formed as separate parts and then connected. In that case, the material of the cap holding portion 34a and that of the elastic portion 34b are not required to be the same.

The cap holding portion 34a is movably engaged with the seal cap main body portion 32 in the circumferential direction of its outer peripheral surface. As shown in FIG. 5, the outer peripheral surface of the seal cap main body portion 32 is provided with a horizontal groove 32a, which is an annular recess provided in a circumferential direction. A C-shaped snap ring 44 is fitted in the horizontal groove 32a. The C-shaped snap ring 44 is a C-shaped metal member having a notch in part, and has an inner diameter approximately equal to the outer diameter of the portion where the horizontal groove 32a of the seal cap main body portion 32 is provided and an outer diameter larger than the outer diameter of the portion where the horizontal groove 32a of the cap main body portion 32 is not provided. The inner diameter of the center hole of the cap holding portion 34a of the cap fixture 34 is larger than the outer diameter of the portion where the horizontal groove 32a of the seal cap main body portion 32 is not provided and smaller than the outer diameter of the C-shaped snap ring 44. The seal cap main body portion 32 is fitted in the center hole of the cap holding portion 34a so that the C-shaped snap ring 44 is positioned below the cap holding portion 34a. In place of the horizontal groove 32a and the C-shaped snap ring 44, a flange protruding from the outer peripheral surface of the seal cap main body portion 32 to the circumferential direction may be provided integrally with the seal cap main body portion 32.

Figure 7:
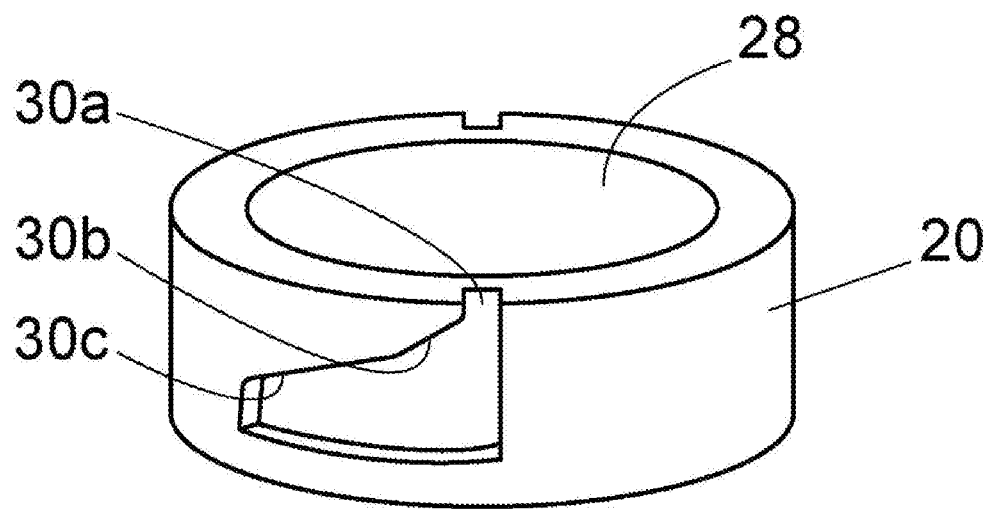
FIG. 7 is a perspective view showing a seal mounting portion of the example.

As shown in FIG. 7, the step portion 30 includes a recess 30a provided on the outside of the upper end face of the cap mounting portion 20 for fitting the pin 36 and continuous side surfaces 30b and 30c facing the base end side of the cap mounting portion 20. The fixing of the seal cap 22 to the cap mounting portion 20 is performed by putting the seal cap 22 on the cap mounting portion 20 so that the pin 36 provided at the tip of the elastic portion 34b of the cap fixture 34 is fitted in the recess 30a (state shown in FIG. 3) and rotating the cap fixture 34 in one direction (in the clockwise direction in FIG. 6A) so that the pin 36 slides along the side surfaces 30b and 30c of the step portion 30 (state shown in FIG. 4).

The side surfaces 30b and 30c of the step portion 30 are inclined with respect to the rotation plane of the cap fixture 34 so that the pin 36 fitted in the recess 30a is displaced to the base end side of the cap mounting portion 20 as the pin 36 moves clockwise along the outer peripheral surface of the cap mounting portion 20. The inclination angles of the side surfaces 30b and 30c are different, and the inclination angle of the side surface 30c is smaller than the inclination angle of the side surface 30b.

As shown in FIG. 5, on the opening side of the internal space 14a of the housing 14, an O-ring 46 (elastic seal member) for sealing a gap between the outer peripheral surface of the insert 16 and the inner wall surface of the internal space 14a is arranged. The O-ring 46 is made of, e.g., fluororubber. In the vicinity of the opening 28 of the inner side wall of the housing 14, an annular pedestal 28a inclined so that its inner diameter decreases downward is provided, and the O-ring 46 is supported by the pedestal 28a. The seal cap main body portion 32 has a recess for accommodating the upper end of the insert 16 on the lower surface side and a lower end portion thereof is accommodated in the opening 28 so as to sandwich the O-ring 46 with the pedestal 28a. The annular lower end surface of the seal cap main body portion 32 is inclined contrary to the pedestal 28a so that its inner diameter increases as it advances downward.

When the seal cap 22 is put on the cap mounting portion 20 so that the pin 36 of the cap fixture 34 is aligned with the recess 30a of the step portion 30, the lower end of the seal cap main body portion 32 comes into contact with the O-ring 46. In this state, when the cap fixture 34 is rotated so that the pin 36 slides along the side surfaces 30b and 30c of the step portion 30, the pin 36 is displaced toward the base end side of the cap mounting portion 20, so that the cap holding portion 34a presses the C-shaped snap ring 44 downward. As a result, the seal cap main body portion 32 is pressed downward. In the cap fixture 34, the cap holding portion 34a is engaged with the C-shaped snap ring 44 to push down the seal cap main body portion 32 while rotating independently of the seal cap main body portion 32. Therefore, it is possible to rotate only the cap fixture 34 without rotating the seal cap 22.

The elastic portion 34b of the cap fixture 34 has a spring property which displaces the position of the pin 36 relative to the cap holding portion 34a in the axial direction of the cap mounting portion 20 and produces a restoring force according to the amount of displacement. When the cap fixture 34 rotates and the pin 36 reaches the end point of the side surface 30c of the step portion 30, the elastic force of the elastic portion 34b presses the seal cap main body portion 32 in a direction of pushing the seal cap main body portion 32 into the opening 28, which causes a deformation of the O-ring 46 to such a degree as to completely prevent a gas from entering into a gap between the inner wall surface of the internal space 14a and the outer peripheral surface of the insert 16.

In the cap fixture 34, for example, the thickness of the cap holding portion 34a is about 1 mm and an outer diameter thereof is about 30 mm, the thickness of the elastic portion 34b is about 1.5 mm, the outside diameter thereof is about 30 mm, and the gap between the cap holding portion 34a and the elastic portion 34b is about 2 mm. As the material of the cap fixture 34, it is suitable to use a material having a tensile strength of about 1,000 MPa, such as, e.g., stainless steel (for example, SUS630, etc.) subjected to a precipitation hardening treatment or a solid solution treatment, stainless steel (for example, SUS301CSP, SUS304CSP, etc.) as a spring material, alloy steel (for example, SCM420, SCM445, SNCM630, etc.), titanium alloy (for example, Ti-6Al-4V (64 titanium)), and copper alloy (for example, beryllium copper, phosphor bronze, etc.).

As described above, since the cap fixture 34 is made of a high strength material, the elastic force of the elastic portion 34b becomes large when the pin 36 is displaced in the axial direction of the cap mounting portion 20. In addition, a restoring force is also generated when the O-ring 46 is deformed by being pressed.

Figure 8:
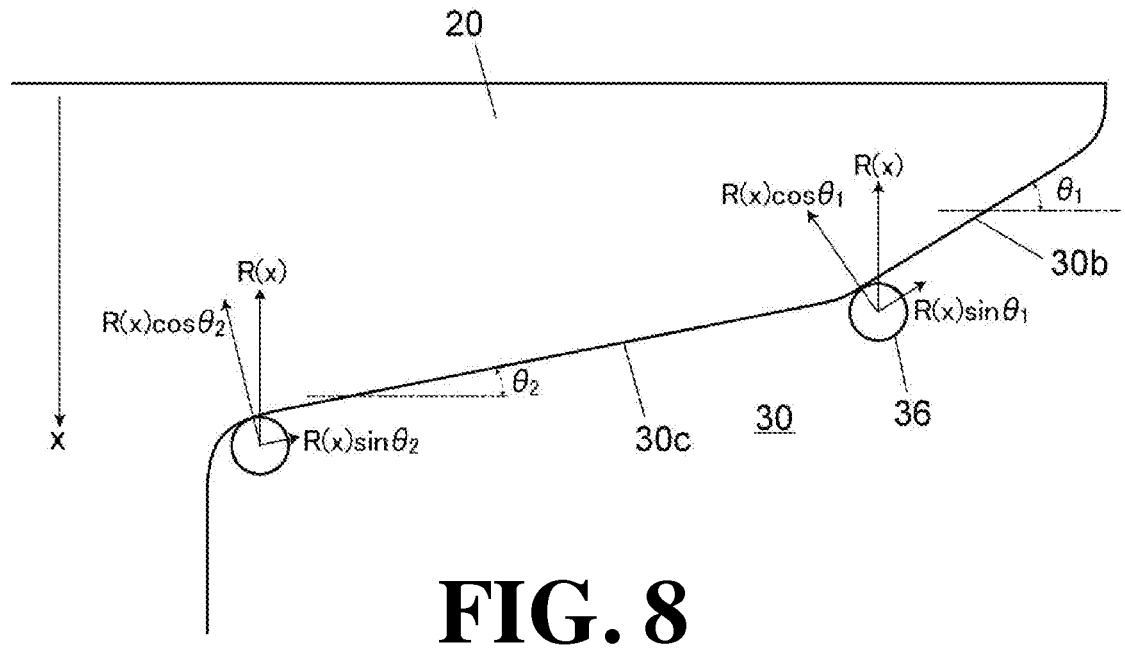
FIG. 8 is a conceptual diagram for explaining a step portion of the sealing mounting portion.

Describing the force acting on the pin 36 with reference to FIG. 8, the elastic force of the elastic portion 34b and the elastic force of the O-ring 46 act on the pin 36 in the axial direction (upward direction in the drawing) of the cap fixture 34. The elastic force of the elastic portion 34b and the elastic force of the O-ring 46 change in accordance with the amount of displacement of the pin 36 in the axial direction of the cap mounting portion 20. Since these forces acting on the pin 36 increase as x increases, they can be expressed as $R(x)$ as a function of x.

Here, the inclination angle of the side surface 30b is denoted as $\theta1$, the inclination angle of side surface 30c is denoted as $\theta2$, and the dynamic friction coefficient between the pin 36 and the side surfaces 30b and 30c is denoted as $\mu$. Of the elastic forces acting on the pin 36 when the pin 36 is in contact with the side surface 30b, the component in the direction perpendicular to the side surface 30b is $R(x)\cos\theta1$, and the component in the direction parallel to the side surface 30b is $R(x)\sin\theta1$.

When the propulsive force acting on the pin 36 when a user rotates the cap fixture 34 in the tightening direction is denoted as F1, the component in the direction parallel to the side surface 30b of the driving force F1 is $F1\cos\theta1$ and the component in the direction perpendicular to the side surface 30b is $F1\sin\theta1$. Therefore, in order to slide the pin 36 along the side surface 30b, the following formula needs to be satisfied.

$F1\cos\theta1 \geq R(x)\sin\theta1 + \mu(R(x)\cos\theta1 + F1\sin\theta1)$

That is, $F1(\cos\theta1 - \mu\sin\theta1) \geq R(x)(\sin\theta1 + \mu\cos\theta1)$ $F1 \geq R(x)(\tan\theta1 + \mu)/(1 - \mu\tan\theta1)$ (1)

In the same manner, of the elastic forces acting on the pin 36 when the pin 36 is in contact with the side surface 30c, the component in the direction perpendicular to the side surface 30c is $R(x)\cos\theta2$, and the component in the direction parallel to the side surface 30c is $R(x)\sin\theta2$.

When the propulsive force acting on the pin 36 when a user rotates the cap fixture 34 in the tightening direction is denoted as F2, the component in the direction parallel to the side surface 30c of the driving force F2 is $F2\cos\theta2$ and the component in the direction perpendicular to the side surface 30c is $F2\sin\theta2$. Therefore, in order to slide the pin 36 along the side surface 30c, the following formula needs to be satisfied.

$F2\cos\theta2 \geq R(x)\sin\theta2 + \mu(R(x)\cos\theta2 + F1\sin\theta2)$

That is, $F2(\cos\theta2 - \mu\sin\theta2) \geq R(x)(\sin\theta2 + \mu\cos\theta2)$ $F2 \geq R(x)(\tan\theta2 + \mu)/(1 - \mu\tan\theta2)$ (2)

From the above formulas (1) and (2), the force F required to slide the pin 36 increases as the amount of displacement x of the pin 36 in the axial direction of the cap mounting portion 20 and the inclination angle $\theta$ of the side surface increase. If $\theta1=\theta2$, then F2>F1. That is, if the side surface of the step portion 30 is linearly inclined without being curved, in the section of the side surface 30c where the amount of displacement x of the pin 36 becomes large and the repulsive force $R(x)$ becomes large, a force greater than on the side surface 30b is required to move the pin 36. In this case, the operation feeling when the user fully turns the cap fixture 34 deteriorates.

In this embodiment, $\theta1$ and $\theta2$ are set so that the propulsive force F1 max required when $R(x)$ becomes maximum on the side surface 30b and the propulsion F2 max required when $R(x)$ becomes maximum on the side surface 30c become substantially the same.

In the section where the amount of displacement of the pin 36 is small, the repulsive force $R(x)$ acting on the pin 36 is small. Therefore, even if the inclination angle $\theta1$ of the side surface 30b is made relatively large, the force F1 necessary for sliding the pin 36 does not much increase and the user's operating feeling does not deteriorate. On the other hand, in the section where the displacement amount x of the pin 36 increases, the repulsive force $R(x)$ acting on pin 36 increases. Therefore, the inclination angle $\theta2$ of the side surface 30c is set to be smaller than $\theta1$ to suppress the increase of the force F2 required for sliding the pin 36. As a result, the maximum value of the force required when a user turns the cap fixture 34 decreases, which can obtain a good operation feeling. Further, since the maximum value of the force F required for sliding the pin 36 is reduced, the maximum value of the vertical drag between the pin 36 and the side surfaces 30b and 30c also becomes small and the maximum frictional force between the pin 36 and the side surfaces 30b and 30c also becomes small. As a result, abrasion of the pin 36 and the side surfaces 30b and 30c is reduced.

Figure 9:
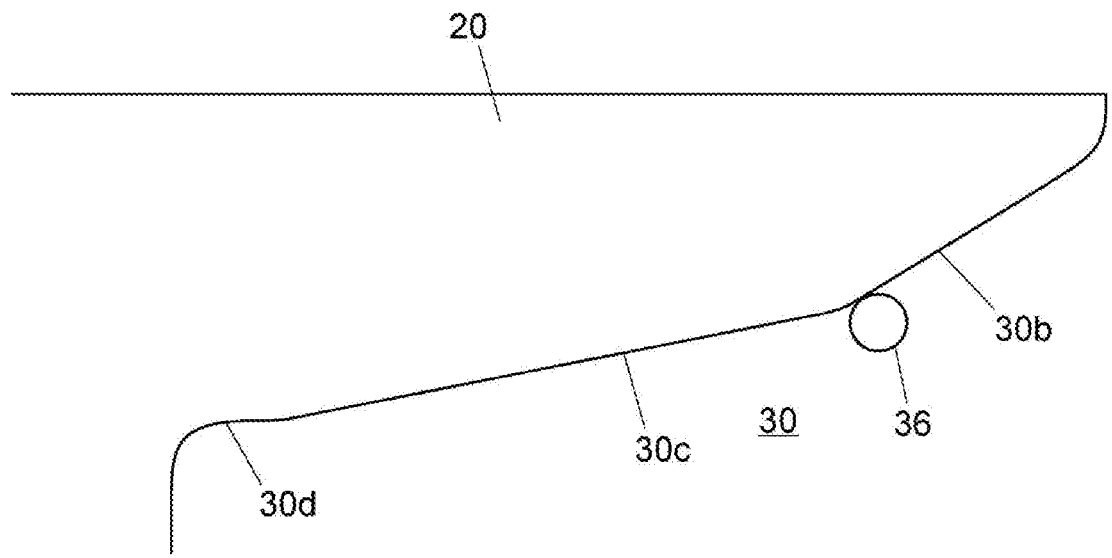
FIG. 9 is a cross-sectional view showing a modification of the step portion of the sealing mounting portion.

As shown in FIG. 9, a side surface 30d parallel to the rotation plane of the cap fixture 34 may be provided on the further side of the side surface 30c of the step portion 30. With this, when the cap fixture 34 is fully turned, no force acts in the direction to push back the pin 36 (in the right direction in the figure), and loosing of the attached seal cap 22 can be prevented.

Figure 10:
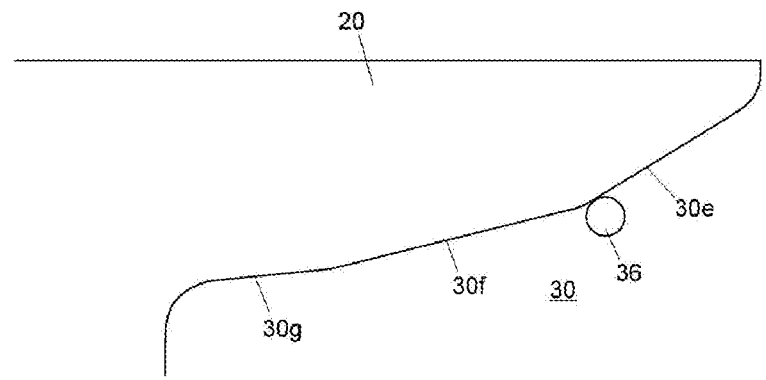
FIG. 10 is a cross-sectional view showing another modification of a step portion of a sealing mounting portion.

Further, the side surface of the step portion 30 may have an inclination angle which becomes smaller in a more stepwise manner. FIG. 10 shows an example having three successive side surfaces of the side surfaces 30e, 30f, and 30g.

Figure 11:
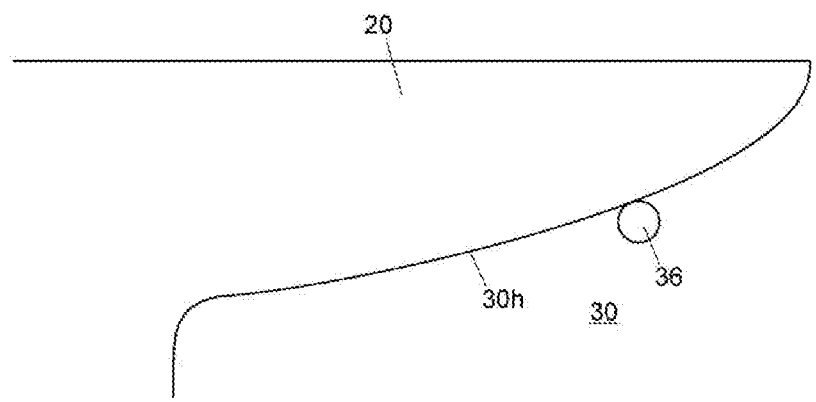
FIG. 11 is a cross-sectional view showing another modification of a step portion of a sealing mounting portion.

Further, as shown in FIG. 11, the inclination angle of the side surface 30h of the step portion 30 may be changed smoothly.

Figure 12:
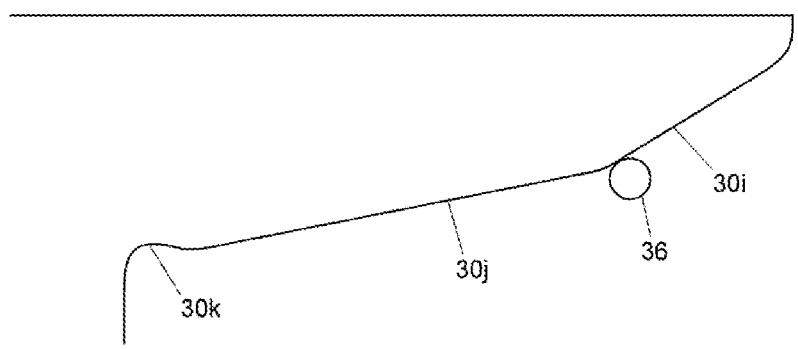
FIG. 12 is a cross-sectional view showing another modification of a step portion of a sealing mounting portion.

Further, as shown in FIG. 12, a locking portion 30k for preventing the return of the pin 36 may be provided at the end point portion of the side surface. In FIG. 12, the locking portion 30k where the pin 36 is caught is provided at the end point of the two continuous side surfaces 30i and 30j. However, like the example of FIG. 11, a locking portion at which the pin 36 is caught may be provided at the end point of the curved side surface 30h in which the inclination angle changes smoothly. Such a locking portion is for locking the cap fixture 34 in a state in which it is fully turned. However, when a force exceeding a certain level acts on the cap fixture 34 in a direction to loosen the cap fixture 34 (in the right direction in the drawing), the locking portion is formed so that the lock can be released.

Also in the examples of FIG. 10 and FIG. 11, in the same manner as explained with reference to FIG. 8, it is preferable to obtain the force F required to slide the pin 36 by simulation and in each section (minute section in FIG. 11) and calculate the inclination angle θ of each section so that the force F is equalized. In doing so, the force necessary for turning the cap fixture 34 is more equalized, which in turn can give a good operation feeling to a user.

In the examples described above, the cap fixture 34 is configured by two disk members (the cap holding portion 34a and two elastic portions 34b). Therefore, the surface area which comes into contact with the outside air is large, which plays a role of radiation fins. As a result, the seal cap 22 can be quickly cooled.

Figure 13:
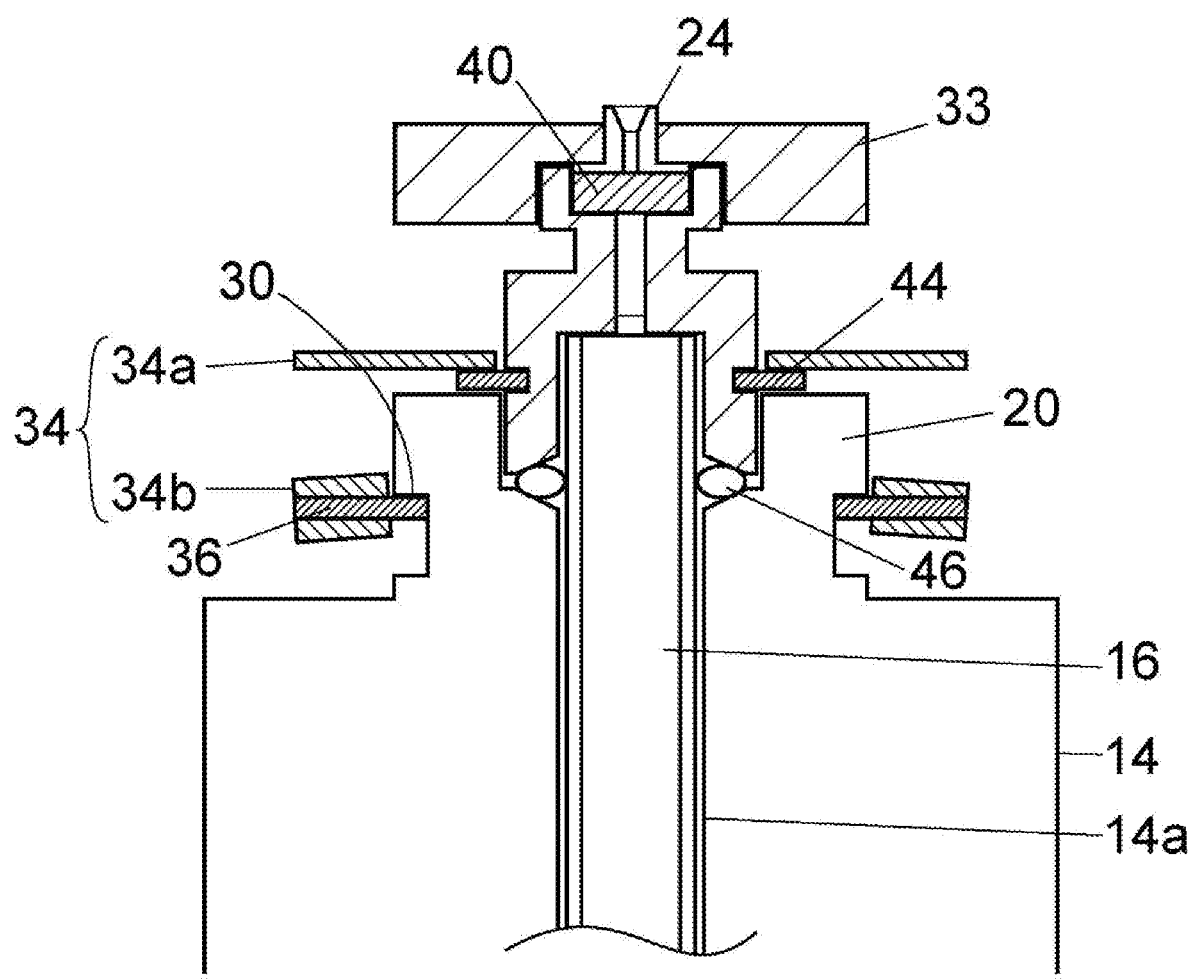
FIG. 13 is a cross-sectional view showing a modification of a cap fixture in the example.

The elastic portion 34b of the cap fixture 34 has an arc shape. Therefore, when the pin 36 slides inside the step portion 30 and the elastic portion 34b is bent, it is conceivable that the outer portion is deformed downward and the inner side is deformed upward. Therefore, in consideration of such deformation, as shown in FIG. 13, the pin 36 may be inclined at the tip of the elastic portion 34b so that the pin 36 takes a posture perpendicular to the outer peripheral surface of the cap mounting portion 20 when the deformation amount of the elastic portion 34b becomes maximum. Then, when the stress applied to the pin 36 is maximum, the pin 36 becomes a state in which the pin 36 is inserted perpendicular to the step portion 30, and the entire upper surface of the pin 36 comes into contact with the wall surface of the step portion 30, thereby preventing stress concentration, which in turn can prevent breakage, wear, etc., of the pin 36.

In the examples described above, the step portion 30 is provided on the outer peripheral surface of the cap mounting portion 20, but the step portion 30 may be provided on the inner peripheral surface of the cap mounting portion 20. In this case, the elastic portion 34b of the cap fixture 34 is formed to have a smaller outer diameter so as to be inserted inside the cap mounting portion 20, and the pin 36 is protruded toward the step portion 30 provided on the inner peripheral surface of the cap mounting portion 20 from the inside of the cap mounting portion 20. By doing so, it is possible to attach the seal cap 22 using the elastic force of the elastic portion 34b in the same manner as in the aforementioned example.

DESCRIPTION OF REFERENCE SYMBOLS 2 sample vaporization unit
2a sample vaporization unit outlet portion
4, 8 flow path
6 analytical column
10 detector
12 column oven
14 housing
14a internal space of the housing
16 insert
18 heater
20 cap mounting portion
22 seal cap
24 needle insertion portion
26 carrier gas supplying pipe
28 opening
30 step portion
30a recess
30b, 30c, 30d, 30e, 30f, 30g, 30h, 30i, 30j side surface of the step portion
30k locking portion
32 seal cap main body portion
32a horizontal groove
33 septum cover
34 cap fixture
34a cap holding portion
34b elastic portion
36 pin
38 lever
40 septum
42 through-hole
44 C-shaped snap ring
46 O-ring

The invention claimed is:

1. An opening sealing structure comprising:
a housing having an internal space and a cylindrical cap mounting portion provided with an opening communicated with the internal space at a tip end side, the structure of the cylindrical cap mounting portion includes a step portion provided on an outer peripheral surface or an inner peripheral surface of the cylindrical cap mounting portion and having a side surface facing a base end side of the cylindrical cap mounting portion, wherein the side surface inclines along a circumferential direction of the cylindrical cap mounting portion from the tip end side of the cylindrical cap mounting portion to the base end side and an inclination angle is smaller in the base end side than in the tip end side;
a seal cap detachably attached to the cylindrical cap mounting portion of the housing to seal the opening;
a ring-shaped elastic sealing member sandwiched between the seal cap and the housing; and
a cap fixture including a cap holding portion movably engaged with the seal cap in a circumferential direction of an outer peripheral surface thereof and an elastic portion connected to the cap holding portion, wherein the elastic portion is provided with a protrusion that engages, through contact, with the side surface of the step portion, and the elastic portion has a spring property for generating an elastic force to press the cap holding portion toward an opening side so that the seal cap deforms the sealing member to seal the opening when the cap fixture is rotatably mounted on the cylindrical cap mounting portion so that the protrusion slides along the side surface of the step portion and the protrusion approaches a position closest to a base end portion of the side surface of the step portion, and wherein the elastic portion is provided at a certain distance from the cap holding portion so as to draw an arc along the periphery of the cap holding portion, a base end of the elastic portion is integrated with the cap holding portion and a tip end of the elastic portion is a free end, and the protrusion is provided the tip end of the elastic portion.

2. The opening sealing structure as recited in claim 1, wherein the step portion has two or more sections in which the inclination angle of the side surface is different from each other, and the inclination angle of each section is an angle at which a maximum value of a force acting on the cap fixture in a rotational direction of the cap fixture is substantially equal in each section.

3. The opening sealing structure as recited in claim 1, wherein a locking portion is provided at a position closest to the base end portion on the side surface of the step portion, the locking portion being configured to be engaged with the protrusion to stop the protrusion at the position.

4. A sample vaporization unit comprising:

a cylindrical insert;

a housing having an internal space for accommodating the insert and a cylindrical cap mounting portion provided with an opening communicated with the internal space at a tip end side, the structure of the cylindrical cap mounting portion includes a step portion provided on an outer peripheral surface or an inner peripheral surface of the cylindrical cap mounting portion and having a side surface facing a base end side of the cylindrical cap mounting portion, wherein the side surface inclines along a circumferential direction of the cylindrical cap mounting portion from the tip end side of the cylindrical cap mounting portion to the base end side and an inclination angle of the base end side is smaller than that of the tip end side;

a seal cap detachably attached to the cylindrical cap mounting portion of the housing to seal the opening;

a ring-shaped elastic sealing member sandwiched between the seal cap and the housing; and a cap fixture including a cap holding portion movably engaged with the seal cap in a circumferential direction of an outer peripheral surface thereof and an elastic portion connected to the cap holding portion, wherein the elastic portion is provided with a protrusion that engages, through contact, with the side surface of the step portion, and the elastic portion has a spring property for generating an elastic force to press the cap holding portion toward an opening side so that the seal cap deforms the sealing member to seal the opening when the cap fixture is rotatably mounted on the cylindrical cap mounting portion so that the protrusion slides along the side surface of the step portion and the protrusion approaches a position closest to a base end portion of the side surface of the step portion, and wherein the elastic portion is provided at a certain distance from the cap holding portion so as to draw an arc along the periphery of the cap holding portion, a base end of the elastic portion is integrated with the cap holding portion and a tip end of the elastic portion is a free end, and the protrusion is provided the tip end of the elastic portion.

5. The sample vaporization unit as recited in claim 4, wherein the step portion has a plurality of sections in which the inclination angle of the side surface is different from each other, and the inclination angle of each section is an angle at which a maximum value of a force acting on the cap fixture in a rotational direction of the cap fixture is substantially equal in each section.

6. A gas chromatograph comprising:

the sample vaporization unit as recited in claim 4;

an analytical column connected to an outlet portion of the sample vaporization unit to perform separation of a sample passed through the sample vaporization unit; and a detector configured to detect the sample separated by the analytical column.

\* \* \* \* \*